US011196761B2

(12) United States Patent
Kaidi (10) Patent No.: US 11,196,761 B2
(45) Date of Patent: Dec. 7, 2021

(54) SECURITY RISK EVALUATION FOR USER ACCOUNTS (71) Applicant: PayPal, Inc., San Jose, CA (US)

(72) Inventor: George Chen Kaidi, Singapore (SG)

(73) Assignee: PayPal, Inc., San Jose, CA (US)

( * ) Notice: Subject to any disclaimer, the term of this patent is extended or adjusted under 35 U.S.C. 154(b) by 272 days.

(21) Appl. No.: 16/438,756

(22) Filed: Jun. 12, 2019

(65) Prior Publication Data

US 2020/0396239 A1 Dec. 17, 2020

(51) Int. Cl.
*H04L 29/06* (2006.01)
*G06F 21/57* (2013.01)

(52) U.S. Cl.
CPC ........ *H04L 63/1433* (2013.01); *G06F 21/577* (2013.01); *H04L 63/102* (2013.01)

(58) Field of Classification Search
CPC ............... H04L 63/1433; H04L 63/102; H04L 63/1416; H04L 63/1425; H04L 63/1441; G06F 21/577
See application file for complete search history.

(56) References Cited

U.S. PATENT DOCUMENTS

| 7,581,112 | B2 | 8/2009 | Brown et al. | |
|---|---|---|---|---|
| 9,386,029 | B2 | 7/2016 | Pham et al. | |
| 10,542,384 | B1 * | 1/2020 | Li | G06Q 20/4014 |
| 10,880,313 | B2 * | 12/2020 | Manna | G06F 16/13 |
| 2011/0307957 | A1 * | 12/2011 | Barcelo | G06F 21/577 |
| | | | | 726/25 |
| 2016/0012526 | A1 | 1/2016 | Kasriel et al. | |
| 2016/0070915 | A1 * | 3/2016 | Knapp | G06F 21/577 |
| | | | | 726/25 |
| 2016/0364727 | A1 * | 12/2016 | DeLawter | G06Q 20/4014 |
| 2017/0078322 | A1 * | 3/2017 | Seiver | H04L 41/12 |
| 2017/0230418 | A1 * | 8/2017 | Amar | H04L 63/08 |
| 2017/0359220 | A1 * | 12/2017 | Weith | G06F 16/25 |
| 2018/0033009 | A1 * | 2/2018 | Goldman | G06Q 40/10 |
| 2019/0012441 | A1 * | 1/2019 | Tuli | G06F 21/316 |
| 2019/0222597 | A1 * | 7/2019 | Crabtree | H04L 63/1425 |
| 2019/0222602 | A1 * | 7/2019 | Linder | G06F 16/24578 |
| 2020/0120135 | A1 * | 4/2020 | Hu | H04L 63/102 |
| 2020/0167788 | A1 * | 5/2020 | Bell | G06K 9/00483 |
| 2020/0311298 | A1 * | 10/2020 | Dunjic | H04L 63/102 |

* cited by examiner

*Primary Examiner* — Sarah Su
(74) *Attorney, Agent, or Firm* — Kowert, Hood, Munyon, Rankin & Goetzel, P.C.

(57) ABSTRACT

Techniques are disclosed relating to account security operations based on security risk values that are modified based on one or more security risk criteria. In some embodiments, a system stores a plurality of key-value pairs in a datastore. Each key may specify a set of multiple access attributes corresponding to an origin computing system from which one or more access attempts were initiated and each value may include access information for one or more access attempts whose access attributes match a corresponding key. In some embodiments, the access information includes one or more account identifiers and result indications. In some embodiments, the system modifies security risk values based on multiple security risk criteria associated with different granularities of information in the datastore. A first criterion may be evaluated at a key granularity based on access attempts that match all of the multiple access attributes for a key. A second criterion may be evaluated at an account granularity based on the access attempts to the account.

20 Claims, 6 Drawing Sheets

Example rule A
(key granularity):
410

Increment security values for accounts with access attempts matching a particular key in response to detecting a threshold number of failed access attempts that match the key.

Example rule B
(sub-key granularity):
420

In response to detecting a threshold number of different accounts being logged in with access attempts matching a particular subset of a set of multiple access attributes, increment security values for the accounts.

Example rule C
(account granularity):
430

Increment a security value for an account in response to detecting a threshold number of access attempts for the account within a threshold time interval.

| | amanda@paypal.com | valerie@paypal.com | manda@paypal.com | | hazel@paypal.com |
|---|---|---|---|---|---|
| Time 1 | 0 | 0 | 0 | | 0 |
| Time 2 (after triggering rule A) | 1 | 0 | 1 | ••• | 0 |
| Time 3 (after triggering rule B) | 2 | 0 | 1 | | 1 |
| Time 4 (after triggering rule C) | 3 | 0 | 1 | | 1 |

SECURITY RISK EVALUATION FOR USER ACCOUNTS

BACKGROUND

Technical Field

This disclosure relates generally to electronic account security, and, more specifically, to techniques for evaluating security risk for user accounts.

Description of the Related Art

User accounts are often subject to different forms of attack, including account takeovers or session hijacking, from malicious or unauthorized users. For example, a malicious user may obtain information about a user's account through username enumeration. For example, a malicious user may determine whether one or more usernames are valid by sending one or more emails to a given username and checking whether they are returned (e.g., bounce) or by checking whether an error message appears on a login page for the given username. Malicious users may implement various techniques to obtain access to a user's account including brute force techniques to guess or confirm valid account credentials and combinations.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—configured to—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "security module configured to adjust security risk values" is intended to cover, for example, a computer system that performs this function during operation, even if it is not currently being used (e.g., when its power supply is not connected). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example. When used herein, the term "or" is used as an inclusive or and not as an exclusive or. For example, the phrase "at least one of x, y, or z" means any one of x, y, and z, as well as any combination thereof (e.g., x and y, but not z or x, y, and z).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for evaluating security risk associated with user accounts and performing security operations based on the evaluation. Such security operations may be performed, for example, to reduce or avoid malicious or unauthorized access to user accounts. A security module may monitor and evaluate the security risk of an account based on information associated with access attempts and one or more security risk criteria. The information associated with an access attempt may be associated with a computing system from which the attempt originated (e.g., an IP address, device signature, browser user agent, etc.) as well as an account identifier and a success or failure indication for the access attempt. The system may store access attempt information as key-value pairs and the system may modify security risk values associated with an account based on access attempts meeting one or more threshold criteria at various granularities (e.g., key, sub-key, or account granularity). Further, the disclosed techniques may be used in conjunction with other security modules based on information in the key-value pairs. In some embodiments, disclosed techniques may advantageously increase detection accuracy for unauthorized access attempts and preventative measures may reduce or avoid unauthorized access to sensitive data.

Security Module Overview

Figure 1:
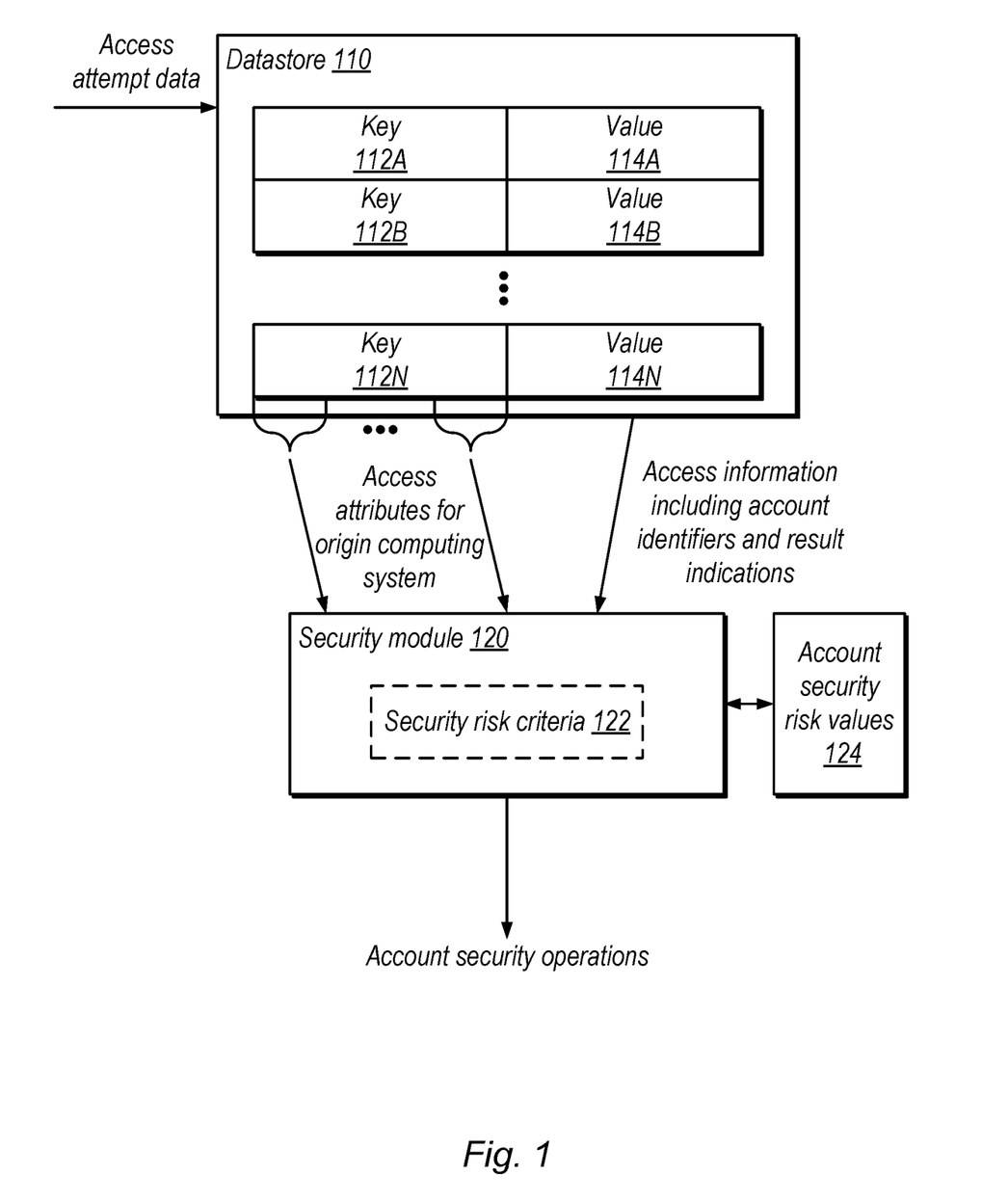
FIG. 1 is a block diagram illustrating an example security module configured to adjust security risk values for accounts based on data for account access attempts, according to some embodiments.

FIG. 1 is a block diagram illustrating an example security module configured to modify security risk values for accounts based on access data from a datastore, according to some embodiments. In the illustrated embodiment, security module 120 interacts with datastore 110 to generate one or more account security operations.

Datastore 110, in the illustrated embodiment, receives data for one or more access attempts and stores the data as one or more pairs of keys 112 and values 114. In the illustrated example, datastore 110 stores keys 112A-N and values 114A-N. A given key-value pair may include information associated with multiple access attempts to one or more accounts. Each key 112 includes one or more access attributes for an origin computing system. In some embodiments, the access attributes for origin computing systems include one or more of the following: an interne protocol (IP) address, a hardware device signature, a browser user agent, cookie data, a referral entity, a web endpoint used for access attempts, or a date. For keys that include multiple access attributes, one or more of those attributes may be referred to as a sub-key. Each value 114 includes access information for access attempts that match the corresponding key. In the illustrated embodiment, this access information includes one or more account identifiers and one or more result indications that indicate whether an access attempt was successful (e.g., account usernames, access attempt times, number of access attempts, success or failure, etc.). Access attributes and access information are discussed in further detail below with reference to FIGS. 2-4.

Security module 120, in the illustrated embodiment, accesses keys and values from datastore 110 and adjusts account security risk values 124 based on multiple security risk criteria 122. In the illustrated example, security module 120 performs one or more account security operations based on account security risk values 124. For example, security module 120 may send a message to an account owner, initiate other security checks, require additional verification, lock an account, initiate a password reset, etc. In some embodiments, module 120 performs a security operation when a corresponding threshold security risk value is met.

As used herein, the term "sub-key" refers to a portion of access attributes that is less than the entirety of the access attributes included in a key. For example, if a key includes access attributes A, B, and C, a sub-key of the key may include access attributes A and B, or attributes A, B, and a portion of attribute C. A computer system may evaluate one or more security risk criteria based on the entirety of access attributes included in a key or based on the access attributes included in a sub-key of the key.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Example Key-Value Pairs

Figure 2:
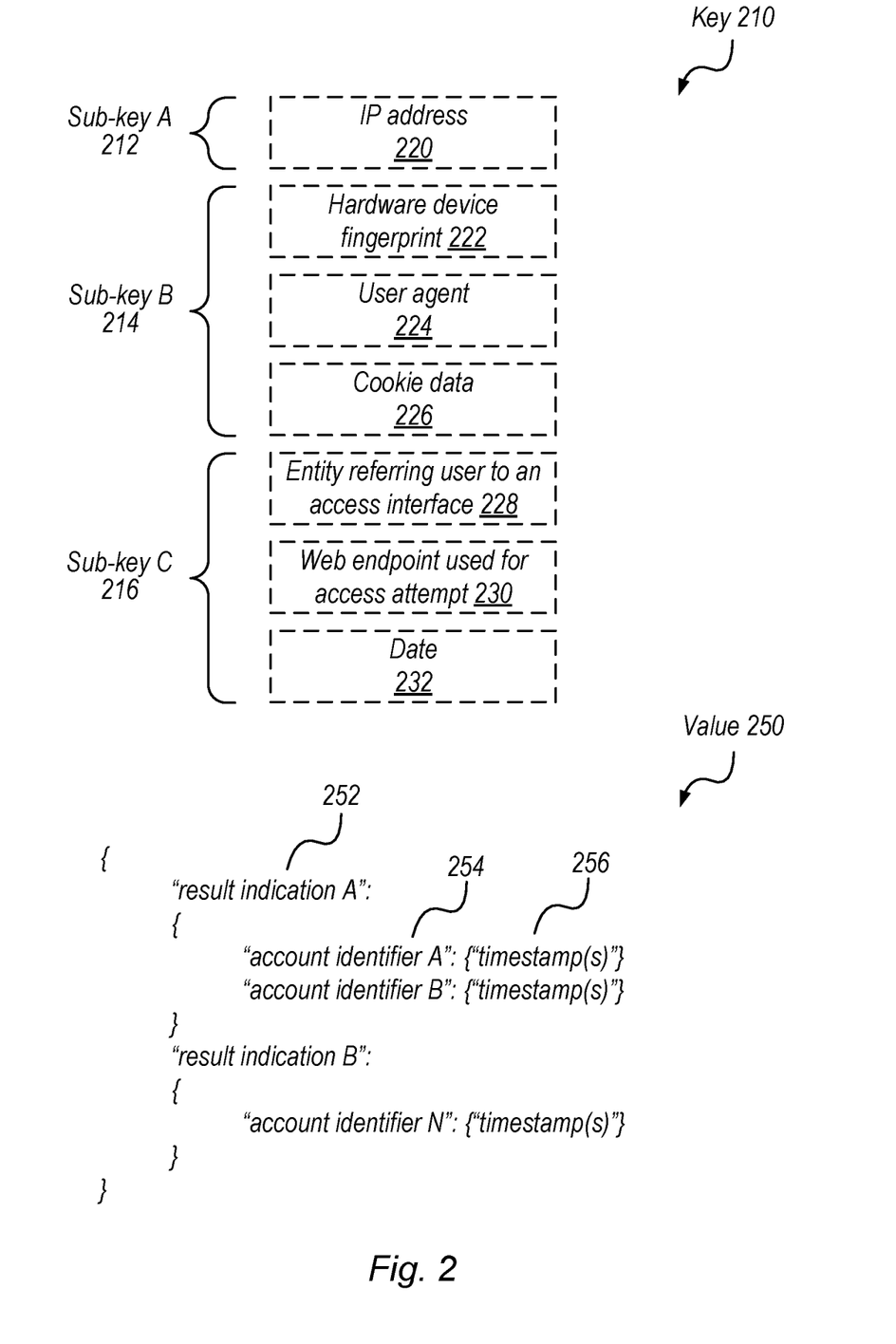
FIG. 2 is a diagram illustrating example access attribute types used for keys and access information types stored in corresponding values, according to some embodiments.

FIG. 2 is a diagram illustrating example key fields and value fields, according to some embodiments. In the illustrated embodiment, key 210 includes access attributes 220-232 for a computing system from which login attempts originate and value 250 includes access information 252-256 for one or more access attempts that match the corresponding key.

Sub-key A 212, in the illustrated embodiment, includes an IP address 220 of a computing system attempting to access one or more accounts. As discussed above, certain security criteria may be evaluated based on access attempts that match a key or sub-key.

Sub-key B 214, in the illustrated embodiment, includes three access attributes: hardware device fingerprint 222, user agent 224, and cookie data 226. In some embodiments, hardware device fingerprint 222 is generated based on one or more hardware characteristics of a user device that initiates one or more access attempts. For example, the fingerprint may be generated based on a device ID, device model, component serial numbers, camera specifications, screen dimensions, memory specifications, etc. In some embodiments, user agent 224 is a web browser user agent that includes operating system and browser details. In some embodiments, cookie data 226 is a web browser cookie or HTTP cookie provided with an access attempt.

Sub-key C 216, in the illustrated embodiment, includes entity 228, web endpoint 230, and a date 232. In some embodiments, entity 228 indicates an entity referring a user to an access interface. For example, the entity may be an HTTP referer that specifies an address of a webpage that links a user to a requested resource. In some embodiments, web endpoint 230 is an endpoint used for an access attempt. For example, the endpoint may include a portion or all of a uniform resource locator (URL) that identifies a location at which one or more resources can be accessed. In some embodiments, the date 232 is a date on which an access is attempted and may be in any of various formats (e.g., mm/dd/yyyy, mm/dd/yy, dd/mm/yy, yyyy/mm/dd, etc.) or granularities (e.g., hour, day, month, or any of various appropriate time intervals).

In some embodiments, value 250 includes information for one or more access attempts that match key 210. In the illustrated example, information for access attempts is grouped by results, e.g., with result indication A for successful attempts and result indication B for unsuccessful attempts. In the illustrated embodiment, each included account has an identifier 254 and one or more timestamps 256 indicating access attempt time(s) for that account that match the key 210.

Figure 3:
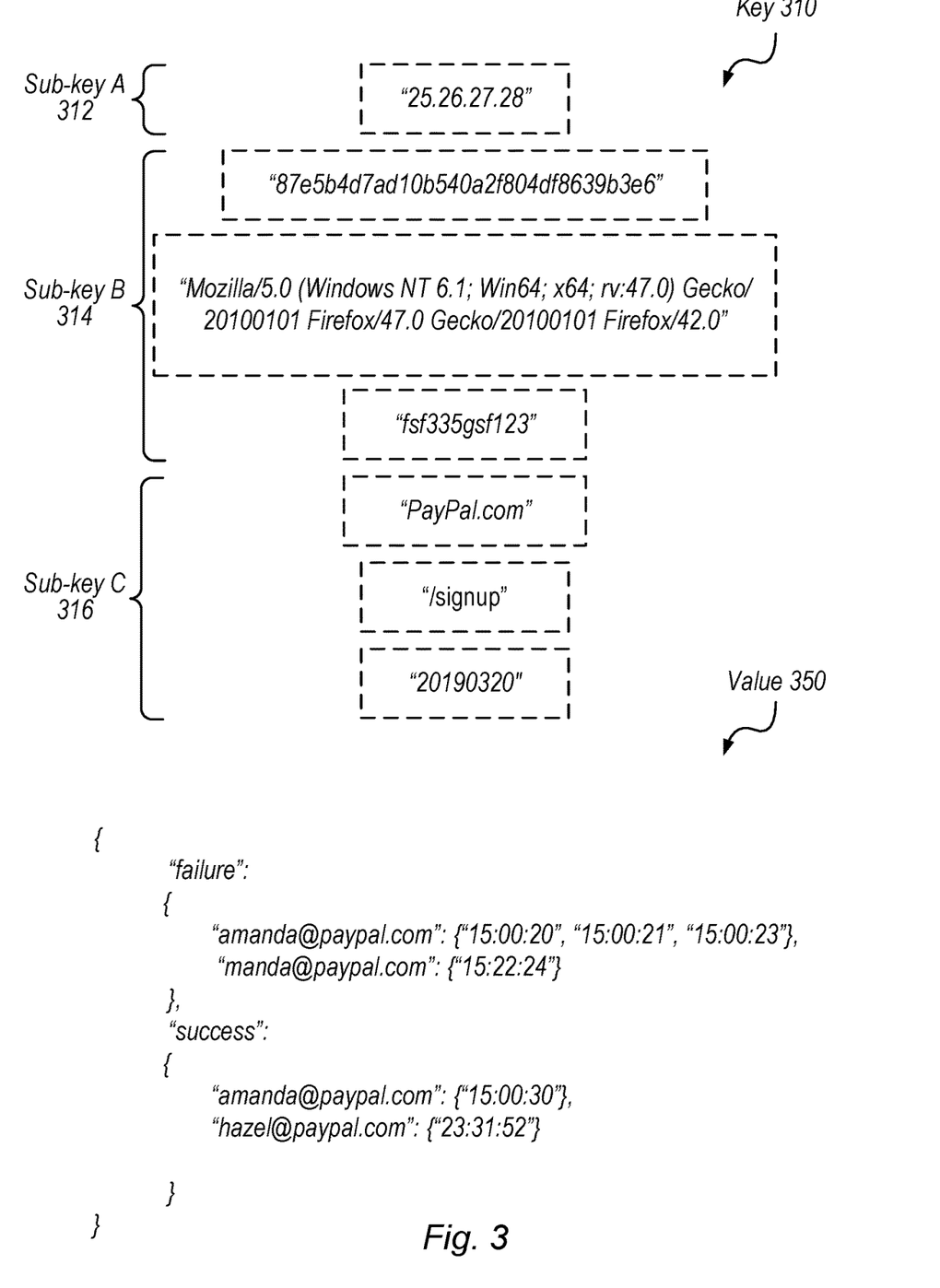
FIG. 3 is a diagram illustrating an example key-value pair with example access attributes and access information for multiple access attempts, according to some embodiments.

FIG. 3 is a diagram illustrating example values for fields of the key-value pair of FIG. 2, according to some embodiments. In the illustrated embodiment, key 310 includes multiple access attributes and value 350 includes access information for login attempts associated with key 310.

In the illustrated example, the IP address is 25.26.27.28, the hardware device fingerprint is 87e5b4d7ad10b540a2f804df8639b3e6, the user agent is Mozilla/5.0 (Windows NT 6.1; Win64; x64; rv:47.0) Gecko/20100101 Firefox/47.0 Gecko/20100101 Firefox/42.0, the cookie is fsf335gsf123, the referrer is PayPal.com, the endpoint is/signup and the date is Mar. 20, 2019.

In the illustrated example, value 350 includes access information for login attempts whose access attributes match key 310 for three different accounts. For example, the account amanda@paypal.com has three failed login attempts with three corresponding timestamps and one successful login attempt, which occurred after the three failures. Similarly, the manda@paypal.com has a failed login while the hazel@paypal.com account had a successful login attempt.

In some embodiments, keys of access attempts may have sub-keys that match the sub-keys 312, 314, and 316 of key 310. In some embodiments, access attempts for a given account may have sub-keys that match multiple different keys. For example, an access attempt that has a different IP address than the login attempts shown in the illustrated example of FIG. 3 may have an IP address that matches a different key. In some embodiments, login attempts with sub-keys that match multiple different keys are associated with a higher security risk value than login attempts with sub-keys that do not match multiple different keys. Evaluation of security risk for one or more accounts based on information associated with login attempts is discussed below in detail with reference to FIG. 4.

Example Security Criterion at Different Granularities

Figure 4:
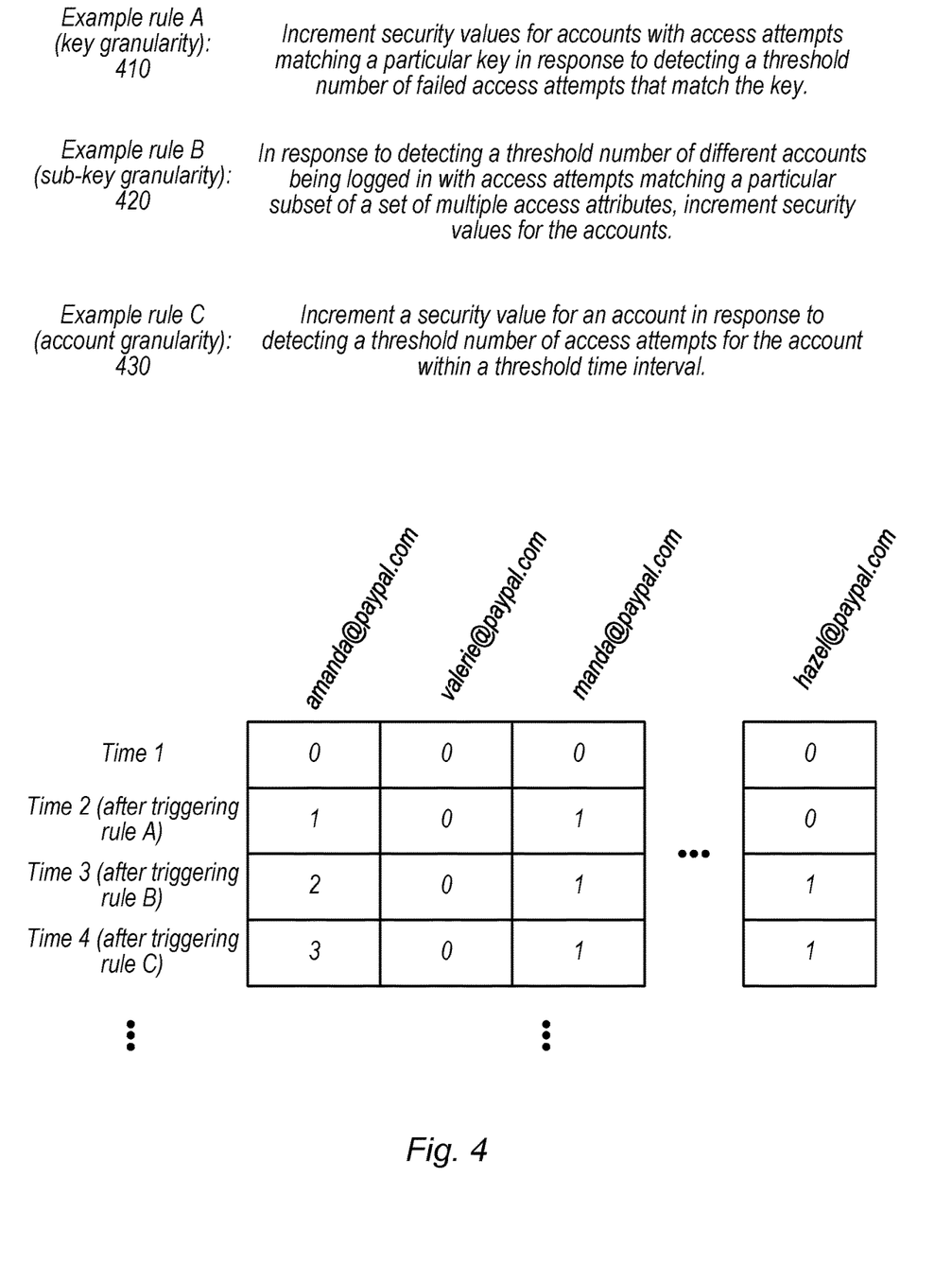
FIG. 4 is a diagram illustrating different example security criteria at different granularities and security risk values determined based on the example criteria, according to some embodiments.

FIG. 4 is a diagram illustrating different example rules and security risk values determined based on the example rules, according to some embodiments. In the illustrated example, rules 410, 420, and 430 are triggered at different times to modify security risk values for different accounts. The illustrated table shows example adjustments to the accounts of FIG. 3 based on these rules. As discussed in detail below, the example rules A-C are evaluated based on activities monitored at different granularities, e.g., key (rule A), sub-key (rule B), and account (rule C).

Example rule A 410, in the illustrated embodiment, specifies to increment security values for accounts with access attempts matching a particular key in response to detecting a threshold number of failed access attempts that match the key. In some embodiments, the security risk value is incremented for each failed access attempt for each account, when there are multiple failed access attempts for a given key. In the context of FIG. 3, for example, where there are four failed login attempts for key 310 the security risk value for manda@paypal.com may be incremented once and the security risk value for amanda@paypal.com may be incremented three times. In other embodiments, module 120 increments the security risk value for each corresponding account a single time based on rule A 410 being triggered.

Example rule B 420, in the illustrated embodiment, specifies to, in response to detecting a threshold number of different accounts being logged in with access attempts matching a particular subset of a set of multiple access attributes, increment security values for the accounts. This is an example of a rule that is evaluated at a sub-key granularity. For example, this rule may specify to increment the security risk value for each corresponding account when more than two accounts are successfully logged in with one or more of the same sub-keys. Note that, in the example of FIG. 3, two different accounts, amanda@paypal.com and hazel@paypal.com, are successfully logged in and are associated with the same sub-key B 314 (they have the same hardware device fingerprint, user agent, and cookie data). When rule B 420 is triggered in this example, the security risk values for accounts amanda@paypal.com and hazel@paypal.com may be incremented.

Example rule C 430, in the illustrated embodiment, specifies to increment a security value for an account in response to detecting a threshold number of access attempts for the account within a threshold time interval. The interval may be specified in various units such as seconds, minutes, days, etc. For example, FIG. 3 shows three failed login attempts for amanda@paypal.com, where the attempts are one and two seconds apart, respectively. In the example of FIG. 4, the system increments the security risk value for amanda@paypal.com based on rule C. In this example, the threshold number of access attempts may be three and the threshold time interval may be 5 seconds (although various thresholds are contemplated).

In some embodiments, the system decrements security values over time. Note that while incrementing/decrementing security risk values is discussed for purposes of illustration, any of various operations may be used to adjust security risk values. In some embodiments, different rules cause different types or magnitudes of adjustments. Similarly, security risk values may be stored using various encodings, the disclosed integer representations are included for purposes of illustration but are not intended to limit the scope of the present disclosure.

The table of FIG. 4 shows security risk values over time for four accounts: amanda@paypal.com, valerie@paypal.com, manda@paypal.com, and hazel@paypal.com.

In the illustrated example, the security risk values for each account at time 1, prior to any access attempts triggering the illustrated rules, are zero. At time 2 in the illustrated example, after incoming access attempts trigger rule A, security module 120 increases security values for amanda@paypal.com and manda@paypal.com. At time 3, security module 120 increases the security values for accounts amanda@paypal.com and hazel@paypal.com in response to logins for those accounts triggering rule B. Finally, at time 4, after example rule C is triggered, security module 120 increases the security risk value for account amanda@paypal.com. Note that account valerie@paypal.com is not incremented in the illustrated example e.g., this account does not satisfy any of the security criteria of rules A, B, or C.

Note that rules A, B, and C 410-430 are non-limiting examples of rules that may be applied for one or more access attempts based on evaluating one or more security criteria. In some embodiments, multiple different rules are applied at multiple different granularities. For example, two different rules may be applied at the key granularity for a given account.

The following discussion lists a number of additional example security criteria for evaluating access attempts, beginning with key-level criteria. Note that the various security criteria discussed herein may be used alone or in various combinations and the combinations may include various types of criteria (e.g., criteria at key, sub-key, or account granularities). Further, the listed criteria are included for purposes of explanation but are not intended to limit the scope of the present disclosure.

In some embodiments, a security criterion specifies a threshold number of different accounts accessed with access attributes corresponding to the same key. In some embodiments, a security criterion specifies a threshold number of different accounts accessed within a threshold time interval with access attributes corresponding to the same key. For example, when multiple accounts with the same key are successfully logged in at the same time, security module 120 may increment security risk values for each account. In some embodiments, when multiple accounts with the same key are successfully logged in on a given day, security module 120 increments security risk values for each account. For example, the accounts may not necessarily be logged in at the same time, but at different times within the same day. In the illustrated example of FIG. 3, accounts amanda@paypal.com and hazel@paypal.com have matching keys and are successfully logged in on the same day although amanda@paypal.com is logged out before hazel@paypal.com is logged in.

In some embodiments, a security criterion specifies a number of access attempts, whose account identifiers meet a threshold similarity, that occur within a time interval and have access attributes that correspond to the same key. For example, when two access attempts use account usernames that are within a threshold similarity within thirty minutes of each other, security module 120 may increment the security risk value for each account. In some embodiments, the system determines a threshold similarity between two usernames using one or more algorithms, such as the Levenshtein algorithm. For example, the Levenshtein algorithm may be used to determine the difference between two strings e.g., where the Levenshtein distance between two strings is the minimum amount of changes that can be made to one string to achieve the other. In the illustrated example of FIG. 3, usernames amanda@paypal.com and manda@paypal.com may be evaluated using the Levenshtein algorithm, for example, to determine that these two account identifiers meet a threshold similarity (e.g., the difference between the identifiers is less than two characters).

In some embodiments, a security criterion specifies a threshold number of access attempts that use invalid account identifiers and have access attributes that correspond to the same key. For example, when an invalid username is entered for an access attempt, security module 120 may increment security risk values for valid accounts whose access attempts match the key or one or more sub-keys of the access attempt with the invalid username. In FIG. 3, manda@paypal.com is one example of an invalid username entered for an access attempt. In some embodiments, security risk values are associated with one or more access attributes, sub-keys, or keys in addition to or in place of accounts. For example, when an invalid username is entered for an access attempt, security module 120 may increment a security risk value for the key associated with the access attempt.

The following example relates to account-level criteria. In some embodiments, a security criterion specifies a threshold number of failed access attempts for a given account. For example, when this criterion threshold is satisfied, a security module (e.g., security module 120) may increment the security risk value for the given account. In the illustrated example of FIG. 3, the three failed access attempts associated with the account for username amanda@paypal.com may meet the threshold number of failed attempts.

In some embodiments, a security criterion specifies a threshold number of accounts having access attempts with access attributes that match a subset of the set of multiple access attributes, where the subset has not been used for access attempts within a threshold time interval. For example, when a given IP address has not been used in the last six months to login to a set of accounts being monitored and then multiple monitored accounts attempt to login using the given IP address, security module 120 may increment security risk values for the accounts.

In some embodiments, security module 120 adjusts security risk values for accounts based on various other security criteria. For example, a security module may determine whether one or more account identifiers (e.g., usernames, passwords, etc.) were previously leaked online. In some embodiments, security module 120 determines whether access attempts for a given account occur in different geographic locations (e.g., cities, states, countries, etc.). In some embodiments, security module 120 determines whether the same password is used in access attempts for different accounts. In some embodiments, security module 120 determines whether different combinations of a given set of usernames and passwords are used for access attempts. For example, if usernames A, B, and C are each used for access attempts with passwords X, Y, and Z, security module may increment security values for accounts associated with usernames A, B, and C. In some embodiments, security module 120 may determine whether an unexpected user agent 224 is associated with an access attempt. For example, a user agent may be a scripted user agent such as client universal resource locator (cURL) when a manual login is expected.

In some embodiments, security module 120 determines whether a high-risk IP address is used for multiple access attempts for different accounts. Note that a high-risk IP address may be one that is associated with user accounts with large security risk values relative to security risk values of other user accounts. In some embodiments, module 120 is configured to adjust security values differently for different types of keys, e.g., using different adjustment weights for keys of different ages.

Example Security Operations

In some embodiments, security module 120 performs one or more account security operations based on modified security risk values for one or more accounts. Security module 120 may perform different security operations based on security risk values meeting different threshold values. Based on a risk value being above a threshold for a given account, security module 120 may evaluate additional security criteria for the account. For example, the security module may identify whether recovery operations (e.g., username or password recovery for the account) were performed previously for the account within a threshold time interval. Evaluation of these additional security criteria may result in additional adjustments to security risk values.

In some embodiments, security module 120 sends one or more notifications to a user device associated with an account based on the security risk value for that account being above a threshold value. For example, security module 120 may send a short message service (SMS) message to a phone number associated with the user account. In some embodiments, for a security risk value above a threshold value for a given account, security module 120 decrements or reduces security thresholds for one or more other types of security modules implemented by the system. In some embodiments, a security module is a lockout module that monitors security lockout values for one or more accounts. For example, security module 120 may reduce a security lockout threshold for a given account and, if a security lockout value for the account meets the reduced lockout threshold, the lockout module may lock or restrict access to the account associated with that security lockout value. For a security risk value above a threshold value, in some embodiments, security module 120 requires additional authentication for the account e.g., multi-factor authentication through an email or SMS message. In some embodiments, for a security value above a threshold value, security module 120 locks the account or prompts a password reset process for the account. Note that the above-described example security operations that may be performed by security module 120 are non-limiting examples and are not intended to limit the scope of the present disclosure.

Example Method

Figure 5:
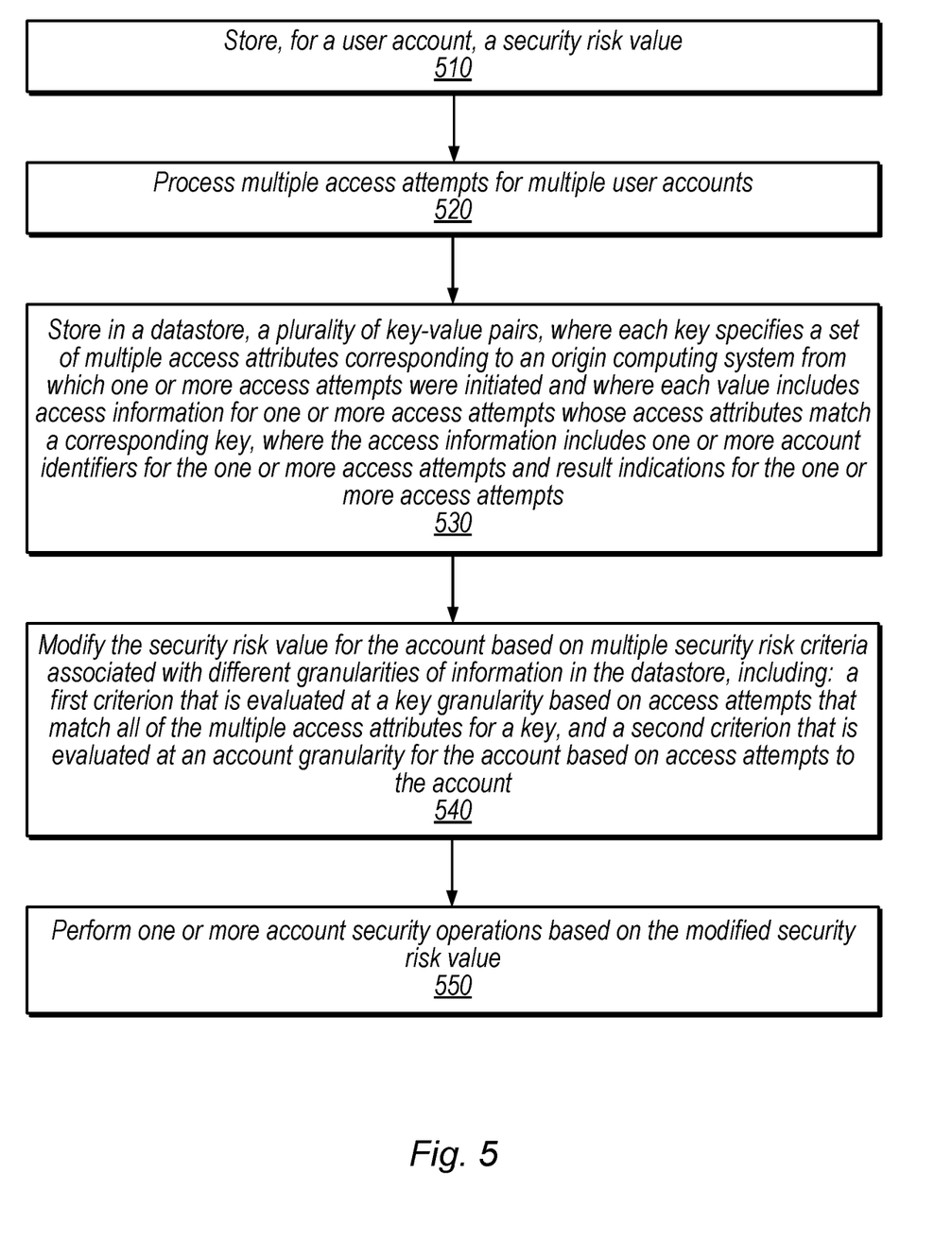
FIG. 5 is a flow diagram illustrating a method for performing a security operation based on modified security risk values for one or more accounts, according to some embodiments.

FIG. 5 is a flow diagram illustrating a method for performing security operations based on modified security risk values for one or more accounts, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 510, in the illustrated embodiment, a computer system stores a security risk value for a user account.

At 520, in the illustrated embodiment, the computer system processes multiple access attempts for multiple user accounts.

At 530, in the illustrated embodiment, the computer system stores in a datastore, a plurality of key-value pairs, where each key specifies a set of multiple access attributes corresponding to an origin computing system from which one or more access attempts were initiated and each value includes access information for one or more access attempts whose access attributes match a corresponding key. In some embodiments, the access information includes one or more account identifiers for the one or more access attempts and result indications for the one or more access attempts. In some embodiments, the multiple access attributes include: an interne protocol (IP) address, a hardware device signature, a browser user agent, cookie data, a referral entity, and a web endpoint used for an access attempt. In some embodiments, the access information further includes one or more of the following: information indicating an access attempt time or information indicating a number of access attempts.

At 540, in the illustrated embodiment, the computer system modifies the security risk value for the account based on security risk criteria associated with different granularities of information in the datastore, including: a first criterion that is evaluated at a key granularity based on access attempts that match all of the multiple access attributes for a key, and a second criterion that is evaluated at an account granularity for the account based on access attempts to the account.

At 550, in the illustrated embodiment, the computer system performs one or more account security operations based on the modified security risk value.

Example Computing Device

Figure 6:
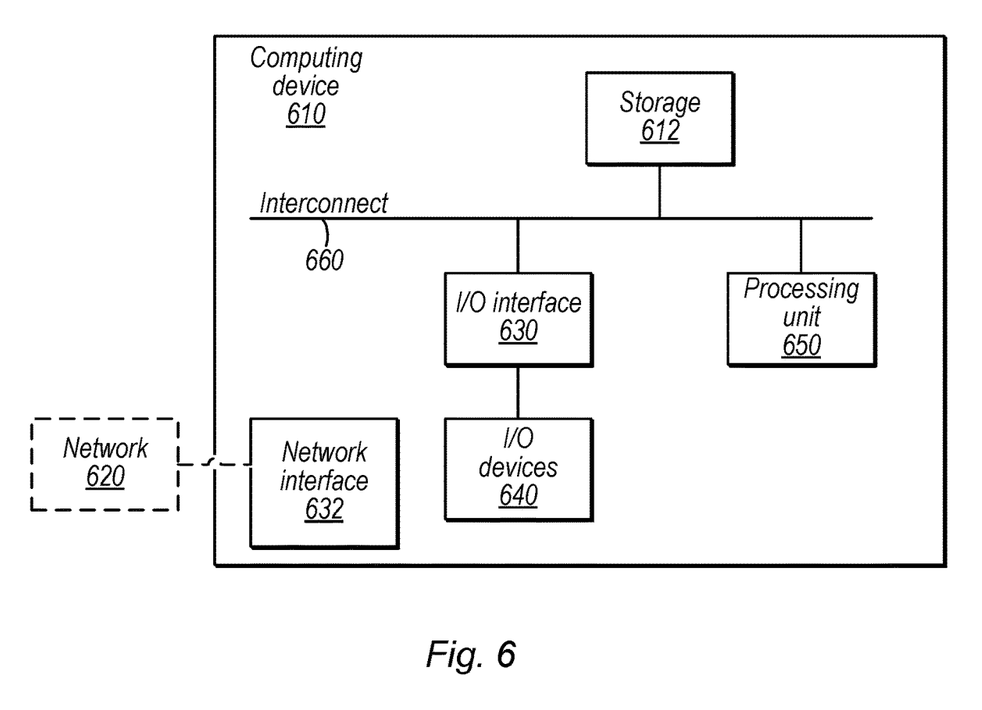
FIG. 6 is a block diagram illustrating an example computing device, according to some embodiments.

Turning now to FIG. 6, a block diagram of one embodiment of computing device (which may also be referred to as a computing system) 610 is depicted. Computing device 610 may be used to implement various portions of this disclosure. Computing device 610 may be any suitable type of device, including, but not limited to, a personal computer system, desktop computer, laptop or notebook computer, mainframe computer system, web server, workstation, or network computer. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 612 may consist solely of volatile memory, in one embodiment. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature.

Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    storing, by a computer system, for a user account, a security risk value;
    processing, by the computer system, multiple access attempts for multiple user accounts;
    storing in a datastore, by the computer system, a plurality of key-value pairs:
        wherein each key specifies a set of multiple access attributes corresponding to an origin computing system from which one or more access attempts were initiated;
        wherein each value includes access information for one or more access attempts whose access attributes match a corresponding key, wherein the access information includes one or more account identifiers for the one or more access attempts and result indications for the one or more access attempts;
    modifying, by the computer system, the security risk value for the account based on multiple security risk criteria associated with different granularities of information in the datastore, including:
        a first criterion that is evaluated at a key granularity based on access attempts that match all of the multiple access attributes for a key; and
        a second criterion that is evaluated at an account granularity for the account based on access attempts to the account; and
    performing one or more account security operations based on the modified security risk value.

2. The method of claim 1, wherein the first criterion specifies a threshold number of different accounts accessed with access attributes corresponding to the same key.

3. The method of claim 1, wherein the second criterion specifies a threshold amount of time between access attempts for a given account.

4. The method of claim 1, wherein the second criterion specifies a threshold number of failed access attempts for a given account.

5. The method of claim 1, wherein the multiple security risk criteria further include:
    a third criterion that is evaluated at a sub-key granularity based on access attempts that match only a subset of the set of multiple access attributes for a key.

6. The method of claim 5, wherein the third criterion specifies a threshold number of different accounts having access attempts matching a particular subset of the set of multiple access attributes.

7. The method of claim 1, wherein the multiple access attributes include: an interne protocol (IP) address, a hardware device signature, a browser user agent, cookie data, a referral entity, and a web endpoint used for an access attempt.

8. The method of claim 1, wherein the access information further includes one or more of:
    information indicating an access attempt time or information indicating a number of access attempts.

9. A non-transitory computer-readable medium having instructions stored thereon that are executable by a computing device to perform operations comprising:
    storing for a user account, a security risk value;
    processing multiple access attempts for multiple user accounts;
    storing in a datastore a plurality of key-value pairs:
        wherein each key specifies a set of multiple access attributes corresponding to an origin computing system from which one or more access attempts were initiated;
        wherein each value includes access information for one or more access attempts whose access attributes match a corresponding key, wherein the access information includes one or more account identifiers for the one or more access attempts and result indications for the one or more access attempts;
    modifying the security risk value for the account based on multiple security risk criteria associated with different granularities of information in the datastore, including:
        a first criterion that is evaluated at a key granularity based on access attempts that match all of the multiple access attributes for a key; and
        a second criterion that is evaluated at an account granularity for the account based on access attempts to the account; and
    performing one or more account security operations based on the modified security risk value.

10. The non-transitory computer-readable medium of claim 9, wherein the first criterion specifies a threshold number of failed access attempts for a given key.

11. The non-transitory computer-readable medium of claim 9, wherein the first criterion specifies a threshold number of different accounts accessed with access attributes corresponding to the same key.

12. The non-transitory computer-readable medium of claim 9, wherein the first criterion specifies a number of access attempts, whose account identifiers meet a threshold similarity, that occur within a time interval and have access attributes that correspond to the same key.

13. The non-transitory computer-readable medium of claim 9, wherein the first criterion specifies a threshold number of access attempts that use invalid account identifiers and have access attributes that correspond to the same key.

14. The non-transitory computer-readable medium of claim 9, wherein the multiple security risk criteria further include:
    a third criterion that is evaluated at a sub-key granularity based on access attempts that match only a subset of the set of multiple access attributes for a key.

15. The non-transitory computer-readable medium of claim 14, wherein the third criterion specifies a threshold number of accounts having access attempts with access attributes that match a subset of the set of multiple access attributes, wherein the subset has not been used for access attempts within a threshold time interval.

16. The non-transitory computer-readable medium of claim 9, wherein the multiple access attributes include: an internet protocol (IP) address, a hardware device signature, a browser user agent, cookie data, a referral entity, and a web endpoint used for an access attempt.

17. The non-transitory computer-readable medium of claim 9, wherein the access information further includes one or more of:
information indicating an access attempt time or information indicating a number of access attempts.

18. An apparatus, comprising:
one or more processors; and
one or more storage elements having program instructions stored thereon that are executable by the one or more processors to:
store for a user account, a security risk value;
process multiple access attempts for multiple user accounts;
store in a datastore a plurality of key-value pairs:
   wherein each key specifies a set of multiple access attributes corresponding to an origin computing system from which one or more access attempts were initiated;
   wherein each value includes access information for one or more access attempts whose access attributes match a corresponding key, wherein the access information includes one or more account identifiers for the one or more access attempts and result indications for the one or more access attempts;
modify the security risk value for the account based on multiple security risk criteria associated with different granularities of information in the datastore, including:
   a first criterion that is evaluated at a key granularity based on access attempts that match all of the multiple access attributes for a key; and
   a second criterion that is evaluated at an account granularity for the account based on access attempts to the account; and
perform one or more account security operations based on the modified security risk value.

19. The apparatus of claim 18, wherein the first criterion specifies a threshold number of different accounts accessed within a threshold time interval with access attributes corresponding to the same key.

20. The apparatus of claim 18, wherein the first criterion specifies a threshold number of failed access attempts within a threshold time interval with access attributes corresponding to the same key.

* * * * *